UNITED STATES PATENT OFFICE.

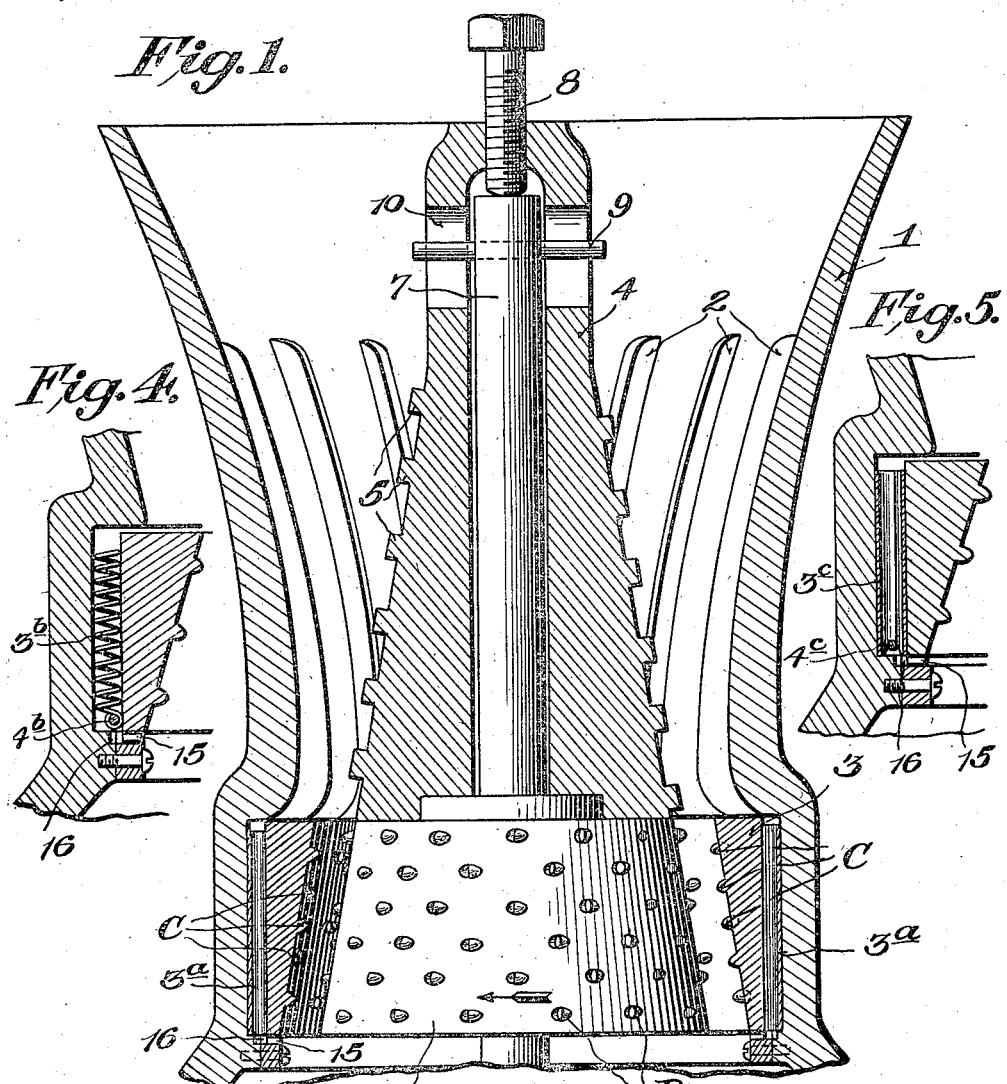

FANNIE SCHUTZ SPITZ, OF ALBUQUERQUE, NEW MEXICO.

METHOD AND APPARATUS FOR SHELLING NUTS.

1,274,803.   Specification of Letters Patent.   Patented Aug. 6, 1918.

Application filed January 10, 1918. Serial No. 211,149.

*To all whom it may concern:*

Be it known that I, FANNIE SCHUTZ SPITZ, a citizen of the United States of America, and a resident of Albuquerque, county of Bernalillo, State of New Mexico, have invented certain new and useful Improvements in Methods and Apparatus for Shelling Nuts, of which the following is a full and clear specification.

The object of my invention is to provide a means for cracking nuts which have irregular shapes and whose shells are thin but flexible and tough. I desire particularly to crack the nut known as the "New Mexican pinon nut".

The meat of these nuts is tender, while the shells are somewhat flexible and at the same time tough and fit practically tight around the meat, leaving only a minute space between the two. Thus it will be seen that the problem of successfully shelling these nuts without crushing or tearing apart the meat is a difficult one. Prior to this invention, it was considered impossible of solution, having baffled experts in the nut-shelling art. One of the main difficulties prominent in the shelling of pinon nuts was the close proximity of the shell to the meat, thereby making the ordinary cracking members of nut-shelling machines in use impracticable for shelling these nuts.

Another difficulty to be met was the extreme toughness of the shell, which precluded the use of crackers which could be used for nuts whose shells are brittle. Still another problem to be met was the multiplicity of size and shapes, even extreme care in grading failing to successfully grade the nuts with respect to their shape and consequently their size, as in most cases measurements of the diameter of the nut along different points thereon would give as many different readings as there were measurements.

Hence it will be seen that in order to successfully shell nuts of this character, something more than a mere nut-cracking machine was necessary, and a machine to efficiently shell these nuts must overcome the above-mentioned difficulties.

In the description annexed hereto, the members used to shell the nuts are termed "cracking members" for the want of a better general term, but the action resulting from the use of these shelling members is one of a ripper rather than a cracker or crusher.

It has been discovered that, by forming the teeth or tearing members with an abrupt face provided with a curved cutting or knife-like edge and allowing the nuts to pass between these abrupt faces, the teeth passing one another at a great speed, the shell is ripped and the meat allowed to fall away from the shell.

It has also been discovered that, in order to efficiently remove the shell without injuring the meat, the length of the teeth must be the same as, or slightly less than, the combined thickness of the shell and the distance between the shell and the meat. By thus limiting the length of the teeth to such a degree, the teeth rip the shell loose and the meats are allowed to pass through the space between the outer edges of the teeth and are discharged at the lower end of the cracking members unharmed.

I have shown the cracking or ripping members in the accompanying drawings as located in the lower end of a shell or hopper, one of the members being in the form of an annular sleeve secured to the inner face of the shell and having the teeth on its inner face. The other cracking member is secured to the lower end of a central cone and forms a continuation thereof and has corresponding teeth on its outer face to coöperate with the above-mentioned teeth of the other cracking member.

In the drawings—

Figure 1 is a vertical section through the shell;

Fig. 2 is a fragmentary detail view of the cracking members;

Fig. 3 is a fragmentary perspective view of one of the cracking members; and

Figs. 4 and 5 are detail views of modified forms of the device.

In the drawings, the numeral 1 indicates the cone-shaped hopper or shell which may be provided with vertically-disposed ribs 2 for assisting in directing the nuts to the cracking members located at the lower part of the shell. Fastened at the lower or discharge end of the shell is an annular cracking member 3 provided upon its inner face with cracking elements or teeth C.

Centrally mounted within the shell 1 and adapted to revolve therein is an upright conical member 4. The cone 4 may be provided with suitable spiral ribs 5 on the exterior of its upper portion to coöperate with the ribs 2 of the shell to direct the nuts to the cracking members.

Affixed to the surface of the cone at the lower end thereof is a second cracking member 6 coöperating with the previously-mentioned cracking member 3 in a manner to be described hereinafter. The cracking member 6 is also provided with cracking elements or teeth D.

The cone is mounted upon a shaft 7 and vertically adjustable thereon, to accommodate various sizes of nuts, by means of a set-screw 8 passing down through the top end of the cone and bearing upon the top end of the shaft 7. The cone is prevented from rotating on the shaft by means of a pin 9 passing through the shaft 7 and working in slots 10 disposed longitudinally in the cone.

The rasp-like teeth or cracking elements C and D are similar in structure and a detailed explanation of one will suffice. These teeth are shown more in detail in Fig. 3 and have an abrupt face 11, forming a circular cutting edge 12 and terminate in an inclined face 13. It will be noted that the teeth upon the cracking member 6 have their abrupt faces facing in a direction opposite to those upon the member 3, and, by thus oppositely disposing the abrupt faces of the teeth and revolving the cone in the direction indicated by the arrow, the abrupt faces of the teeth upon the cracking member 6 are brought to coöperate with the similar abrupt faces of the teeth upon the cracking member 3 and the knife-like edges 12 of the teeth brought into play.

The teeth upon the cracking members 3 and 6 are in staggered relation with respect to themselves and to one another.

The operation and method of shelling the nuts are as follows:

The nuts are fed into the top of the shell or hopper 1 and from there pass between the two shelling members 3 and 6. The cone 4 is rotated at a high velocity in the direction indicated by the arrow, and, as the nuts pass between the members 3 and 6, the abrupt faces 11 and the cutting edges 12 are brought to bear upon the shells of the nuts, as indicated in Fig. 2 in the drawings. The action resulting is that of a ripping or cutting of the shells, the teeth being of a length sufficient only to puncture and rip the shells and leave the meat untouched. As the shells are ripped or torn apart, the meats slip from within them and pass down through the cracking members and are discharged at the lower end thereof.

It should be noted that, owing to the staggered relation of the teeth on the cracking members 3 and 6 and also the staggered relation of the teeth on these members with respect to one another, two teeth are not brought to act on the shell at diametrically opposite points. This is of extreme importance in that a more efficient ripping action will take place when the teeth act at different points on the shell. It will be seen that the nuts will be carried around between the cracking members, due to the velocity at which the cone is rotating; also that the nuts will, in many cases, make several complete trips around between the cracking members before they travel the whole vertical width of the cracking members and are discharged at the lower end. It is obvious, therefore, that, should the shells be only partially ripped at the outset of their downward travel, they invariably undergo additional ripping actions during their downward travel between the cracking members, and, upon the completion of their downward travel, the shells will be completely ripped to thus allow the meats to drop therefrom. In most cases, the shells are ripped entirely from the meats during the first part of the travel of the nuts between the cracking members. As soon as the shells are ripped sufficiently to allow the meats to drop therefrom, the meats will pass between the teeth and be discharged at the lower end of the cracking members without any further action of the teeth upon them.

From the foregoing, it will be seen that I have provided a type of shelling members which will compensate for the irregularity in shape of the product to be shelled and also allow for the extreme toughness of the shells and rip the same rather than crack or crush them.

The cracking member 3 may be rigidly supported or supported in any suitable manner and I have here shown it as resiliently mounted so as to have a slight yielding movement radially, so that the space between the cracking members may be made to accommodate itself to the multi-shaped nuts. This slight yielding movement may be accomplished in various ways, and I have shown several preferred embodiments. In Fig. 1 a serpentine spring $3^a$ circumferentially surrounds the cracking member 6. The cracking member 3 is provided with lugs 15 sliding in slots 16 to prevent rotation of the same, but to allow the radially yielding movement.

In Fig. 4, I have shown a modified form of spring. Here a spiral spring $3^b$ is disposed vertically and held in position by means of a circumferential wire $4^b$. These springs may be disposed at different points around the periphery of the cracking member 3.

In Fig. 5, I have shown still another form of spring. This spring is in the form of a split tube $3^c$ vertically disposed and held in position by means of a wire $4^c$. The springs may also be placed at different points around the periphery of the cracking member 3.

From the foregoing, it will be seen that the outer cracking member is so mounted as to be capable of yielding slightly in any direction.

The nature and scope of the invention having been thus indicated and its preferred embodiment having been specifically described, what is claimed as new is:

1. In an apparatus for shelling nuts of the character set forth, the combination of a pair of shelling members arranged one within the other, and means for rotating the one member with respect to the other, the inner member having an exterior conical shape and the other member having its interior similarly shaped, the two members being spaced apart to form an annular chamber between them, the opposing faces of these members being each provided with a multiplicity of semi-cone shape cutting teeth extending into the chamber a distance sufficient to cut only through the shells of the nuts, the teeth on one member having abrupt faces to form a cutting edge, said abrupt faces facing in an opposite direction to the similarly shaped teeth on the other member and the teeth on each member being staggered with reference to each other.

2. In a machine of the type set forth, two conically shaped cracking members arranged one within the other and spaced apart to form an annular chamber, teeth projecting into said annular chamber, said teeth being formed with an abrupt face forming a cutting edge and terminating in an inclined face, the abrupt faces of the teeth on one cracking member facing in a direction opposite to those of the other cracking member, whereby the nuts may be caught between the abrupt faces of the teeth on the two cracking members to rip the shells from the meats of the nuts.

3. The method of removing shells from nuts having comparatively tough shells which consists of gravitating the nuts in a spiral path and during their travel subjecting them repeatedly to a ripping action simultaneously on opposite sides, whereby the shells will be sheared or ripped and the meats freed therefrom.

4. In a machine of the type set forth, two conically shaped cracking members arranged one within the other and spaced apart to form an annular chamber, the outer cracking member being mounted so as to be yieldable radially, teeth projecting into said annular chamber, said teeth being formed with an abrupt face forming a cutting edge and terminating in an inclined face, the abrupt faces of the teeth on one cracking member facing in a direction opposite to those of the other cracking member, whereby the nuts may be caught between the abrupt faces of the teeth on the two cracking members to rip the shells from the meats of the nuts.

5. In an apparatus for shelling nuts of the character set forth, the combination of a pair of shelling members arranged one within the other, and means for rotating the inner member with respect to the other, the outer member being mounted so as to be yieldable radially, the two members being spaced apart to form an annular chamber between them and the opposing faces of these members being each provided with a multiplicity of cutting teeth extending into the chamber a distance sufficient only to rip the shells from the meats of the nuts, as and for the purpose set forth.

In testimony whereof I hereunto affix my signature.

FANNIE SCHUTZ SPITZ.

Witnesses:
  MARY LOFTUS,
  W. W. APGAR.

Copies of this patent may be obtained for five cents each, by addressing the "Commissioner of Patents, Washington, D. C."